United States Patent
Sisante

(10) Patent No.: US 11,252,880 B2
(45) Date of Patent: Feb. 22, 2022

(54) HYDROPONIC POD ASSEMBLY KIT

(71) Applicant: Primo Antonio Sisante, Houston, TX (US)

(72) Inventor: Primo Antonio Sisante, Houston, TX (US)

(*) Notice: Subject to any disclaimer, the term of this patent is extended or adjusted under 35 U.S.C. 154(b) by 128 days.

(21) Appl. No.: 16/893,303

(22) Filed: Jun. 4, 2020

(65) Prior Publication Data

US 2021/0378191 A1  Dec. 9, 2021

(51) Int. Cl.
*A01G 31/06* (2006.01)
*A01G 31/00* (2018.01)

(52) U.S. Cl.
CPC ........ *A01G 31/06* (2013.01); *A01G 2031/006* (2013.01)

(58) Field of Classification Search
CPC .. A01G 31/06; A01G 2031/006; A01G 31/00; A01G 27/00; A01G 13/0281; A01G 2013/006; A01G 9/022; A01G 9/023; A01G 9/025; A47G 7/08
See application file for complete search history.

(56) References Cited

U.S. PATENT DOCUMENTS

| | | | | |
|---|---|---|---|---|
| 977,818 A * | 12/1910 | Mcmanus | ............... | A01G 9/022 47/39 |
| 4,242,835 A * | 1/1981 | Mondragon Sorribes | ................... | A01G 9/16 47/84 |
| 4,389,813 A * | 6/1983 | Jaques | .................... | A01G 9/022 428/18 |
| 5,225,342 A * | 7/1993 | Farrell | ..................... | A01G 5/06 435/430 |
| 5,555,676 A * | 9/1996 | Lund | ...................... | A01G 9/022 47/82 |
| 5,724,768 A * | 3/1998 | Ammann, Jr. | ......... | A01G 31/02 47/62 A |
| 11,166,420 B1 * | 11/2021 | Diehl | ..................... | A01G 31/06 |
| 2012/0167460 A1 * | 7/2012 | Omidi | .................. | A01G 25/165 47/65.7 |
| 2016/0120141 A1 * | 5/2016 | Stolzfus | ................. | A01G 31/06 47/62 A |
| 2019/0200551 A1 * | 7/2019 | Walters | ................... | A01G 31/02 |
| 2020/0037526 A1 * | 2/2020 | Sperry | .................... | A01G 7/045 |
| 2020/0093082 A1 * | 3/2020 | Mathieu | ................. | A01G 31/06 |
| 2021/0037730 A1 * | 2/2021 | Liberman | .............. | A01G 31/00 |
| 2021/0059126 A1 * | 3/2021 | Curtis | .................... | A01G 9/023 |
| 2021/0161090 A1 * | 6/2021 | Hatran | ................... | A01G 9/249 |

* cited by examiner

*Primary Examiner* — Joshua D Huson
*Assistant Examiner* — Caleb Kelsey Hrubes

(57) ABSTRACT

A flexible plastic molded pod assembly, consisting of a pod collar and a locking pod ring is adapted to easily snap and lock in place against the edges of a circular hole cut through the wall surface of a Vertical Hydroponic System of either a flat or a cylindrical design. The pod assembly will shelter an organic plant matter from its seedling stage to its mature harvest form. The Pod Assembly is adapted to direct the flow of liquid Hydroponic Water with necessary nutrients to the plant in which it shelters. Included in the kit is a water flow diffuser adapted to distribute of Hydroponic water in all directions around the uppermost interior wall of a Vertical Hydroponic System thereby constantly supplying plant matter in each of the pod assemblies below with Hydroponic Water.

3 Claims, 6 Drawing Sheets

Hydroponic Pod Assembly

Fig. 1 - Hydroponic Pod Assembly
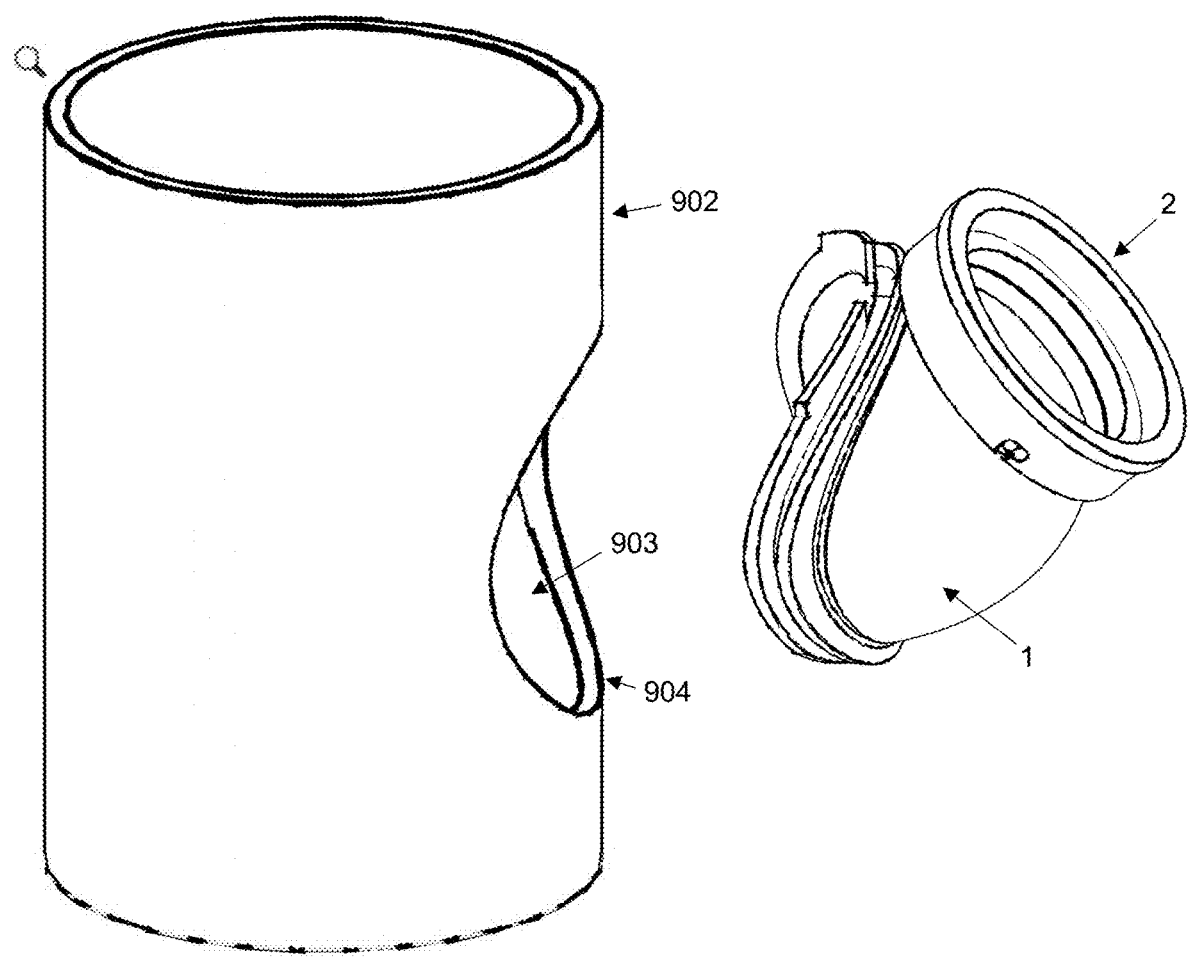

Fig. 2 - Hydroponic Pod Assembly Parts and Features (Exploded View)
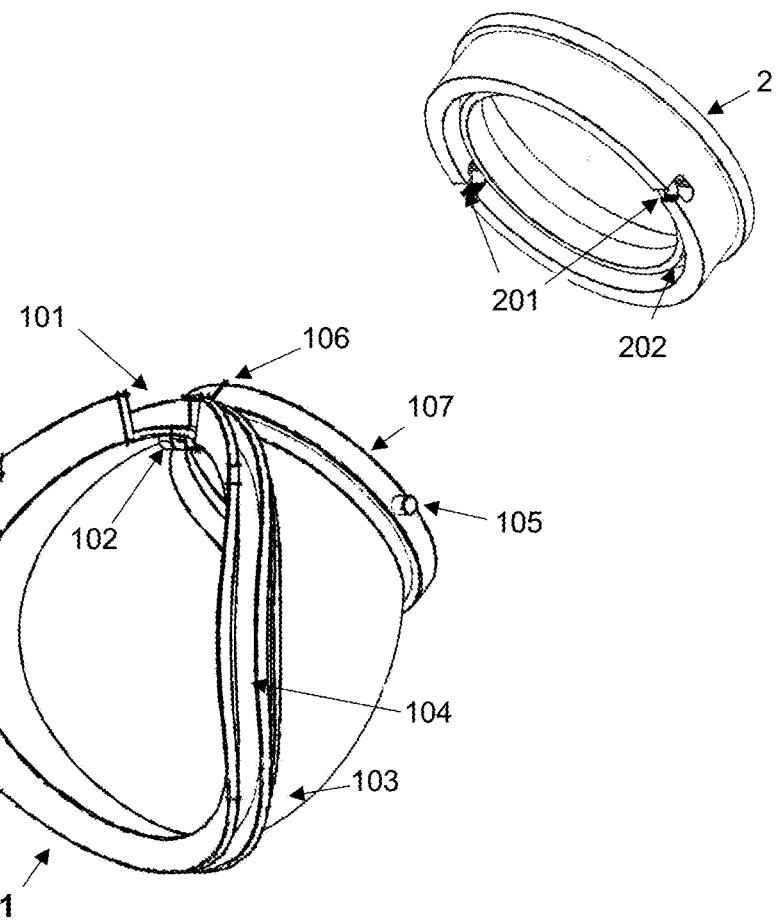
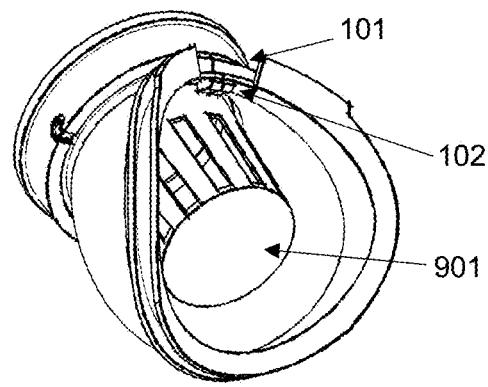

Fig. 3 – Photographic View of the Method of Installing the Pod Assembly

Fig. 4 – Water Flow Diffuser
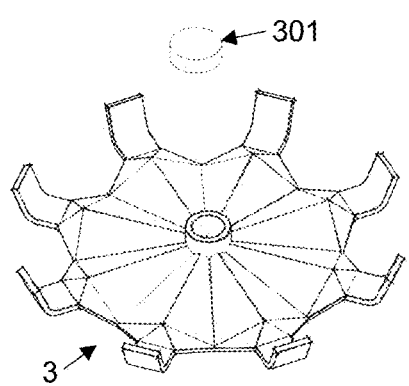
Top View
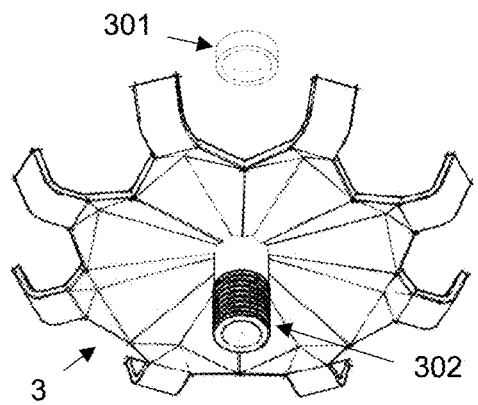
Bottom View
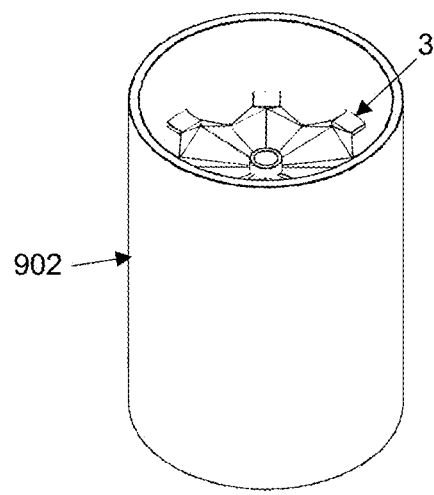
Top View
(When installed inside
Hydroponic Pipe Chamber)

Fig. 5 – X-ray View of the Hydroponic Pod Assembly and Diffuser attached to a Upper Segment of a Vertical Hydroponic System
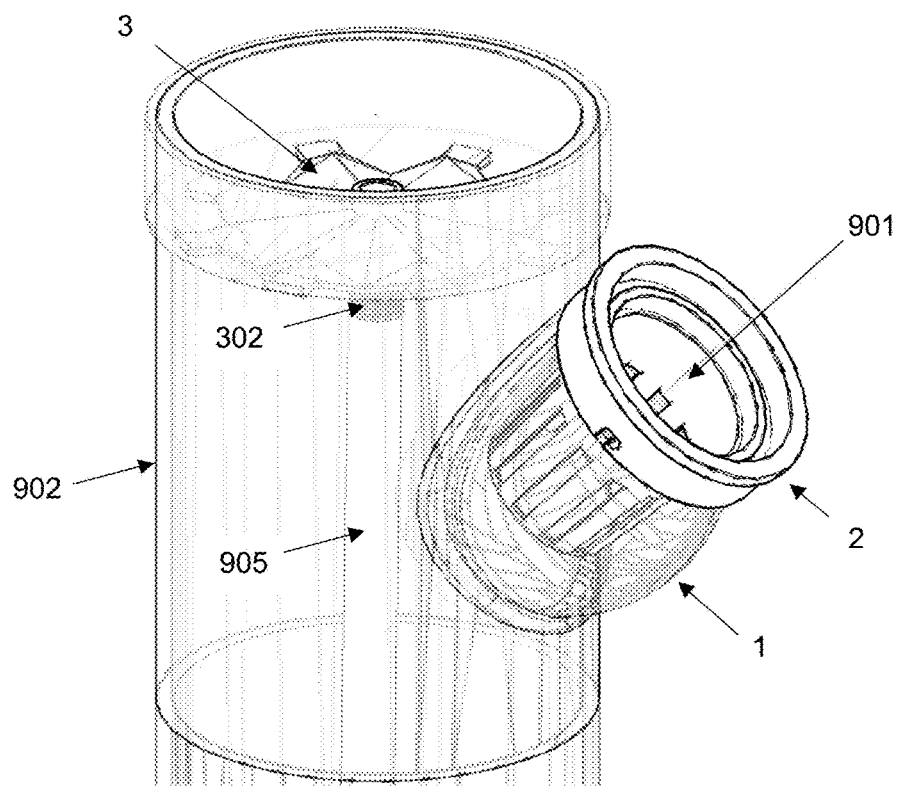
Note: Hydroponic Pipe 902 and basket pot 901 are not part of the Invention Fig. 6 - Vertical Hydroponic System
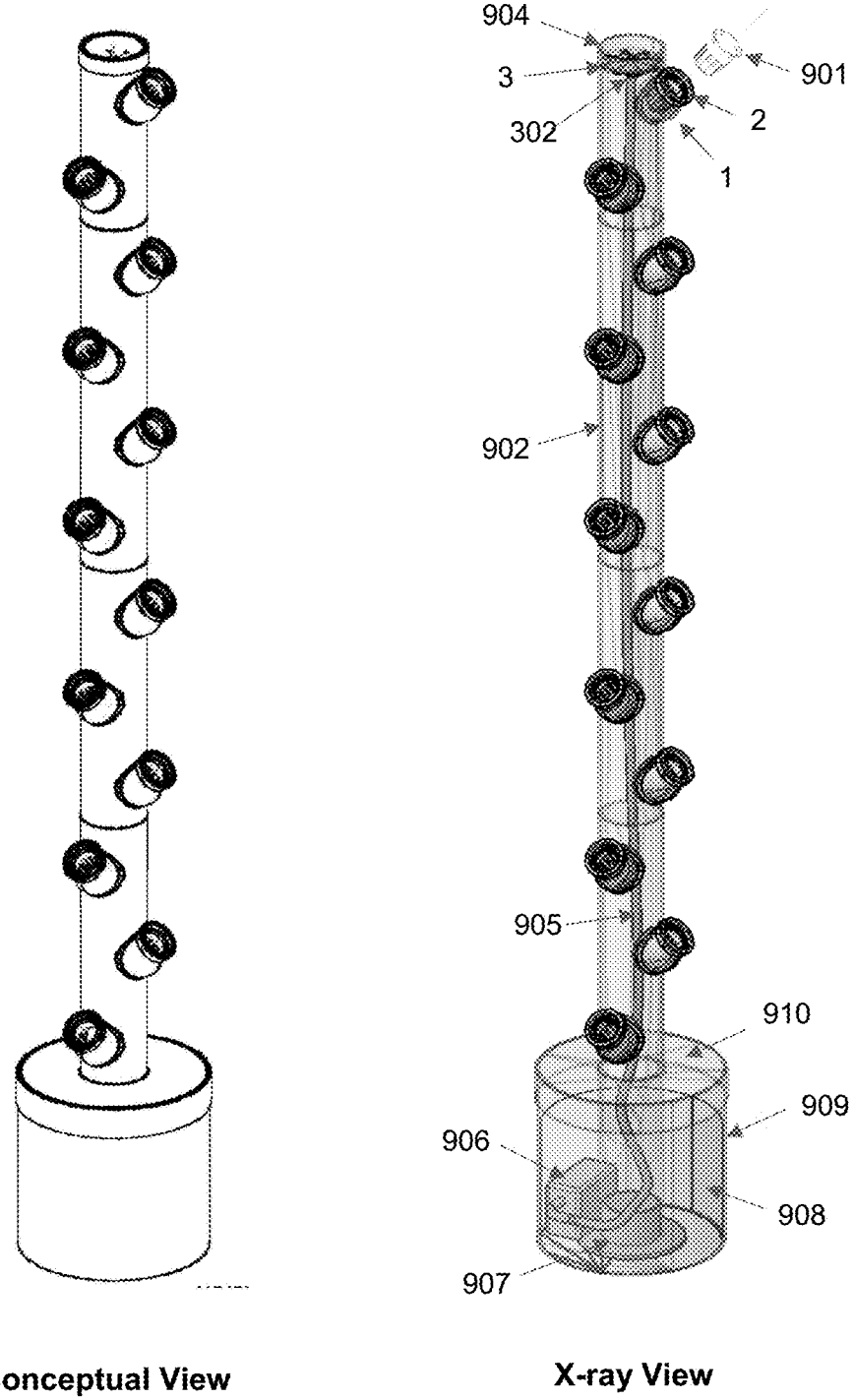
Conceptual View
X-ray View

HYDROPONIC POD ASSEMBLY KIT

BACKGROUND OF THE INVENTION

Hydroponics is the process of growing plants without soil. The plant receives mineral nutrients through recirculated water solution that flows towards the pods in the Hydroponic System. The Pods, which provides shelter to the plants, are attached to the Hydroponic system wall such that the plant roots receives hydroponic solution from the bottom end of the pod while the plant and the harvested crop receives necessary light energy for photosynthesis at the other end. Hydroponic systems with pods arranged in a vertical configuration are known as Vertical Hydroponics. Vertical Hydroponics are devoid of soil borne diseases using the least amount of real estate footprint while enabling the grower to harvest crops at controlled environment particularly during times of artificial supply shortages or even during virus triggered lockdowns. To understand the application of pods in a Hydroponic System, a section in the disclosure provides a brief description of a simple Vertical Hydroponic system.

Most commercial and professional growers use Vertical Hydroponic Towers made of stacked hydroponic cylinder sections with pods molded onto the section. This design makes the cost prohibitive for the cost conscious recreational grower. Instead, a recreational grower may resort to using makeshift pods made of plastic sheet molded pods glued over the hole on the outer wall of hydroponic pipe chamber. Alternatively, some growers may use 3" PVC pipe cut at short lengths with one end cut at a 45-degree angle and glued over a 3" hole drilled on the surface of a long vertical square shape pipe.

Recreational growers often use commercially available 4" to 3" PVC reducing Y pipe connectors that can double as 3 in diameter pods in a 4 in diameter Hydroponic pipe chamber. The 4" reducing Y connectors are stacked to simulate a Hydroponic System Tower. Some creative growers even resort to creating pods by applying heat on a lateral cut made on the wall of a PVC pipe and applying heat on the slit with a heat gun then prying open the slit with a cylindrical device to force the slit to open up with the hole facing upwards. This enables the face of the hole to receive the plant basket pointing upwards.

All pods mentioned above hold plant baskets facing upwards. However, there are no internal features enhancing the flow of hydroponic feed towards the basket. The volume of space specially on using PVC Y connection pipes is restricted and does not provide ample room for roots to grow. In the case of glued pods, the glued side of the pod do not often match the profile of the drilled hole on the hydroponic system wall. Only a small portion of the plant basket protrude the hydroponic system wall thus requiring a plant seedling in the pod to have elongated roots before a plant seedling can be placed in the hydroponic system. Some makeshift pods are made of plastic materials designed for other purpose. These materials may run the risk of contaminating the plant when its roots are exposed to non-food grade materials.

The disclosures set forth herein addresses the above-mentioned problems and inadequacies of the prior art in the application and use of pods in a Vertical Hydroponic system. Benefits and merits that the invention intend to achieve in the use of instruments and methods disclosed in the accompanying claims are as follows:

1) Promote flow of feed towards the plant, 2) minimize, if not eliminate, risk of contamination from the use of makeshift pods with non-food grade materials 3) utilize simplest least cost method of pod installation 4) optimize pod space for plant root growth and 5) provide residual feed during timed watering intervals.

SUMMARY OF THE INVENTION

A Hydroponic pod assembly comprises a pod collar and a locking pod ring. The pod collar has circular grooved channel on the edges on one end that conveniently attach to the wall of the hydroponic system by enabling the collar to grip onto the perimeter edges of a circular hole cut through the wall surface of a Vertical Hydroponic system. The attached end of the pod collar matches the profile of the hole drilled on the hydroponic system wall. To secure the pod collar and prevent it from dislodging from the Hydroponic system wall, a locking pod ring attaches to the pod collar by inserting the base of the pod ring to the open end of the pod collar. The pod ring rests securely onto the pod collar by engaging the two notches on the base of the pod ring against the two pins on the open end of the pod collar. A slight twist will lock the pod ring securely in place. With the pod assembly in place, the pod assembly is now ready to receive a market available standard plant basket containing any plant matter from its seedling stage to its mature harvest form. The pod collar allows the plant basket to be set at 45° angle such that the base of the basket protrudes through the wall of the enclosed Vertical Hydroponic System in order to receive the necessary nutrients from the Hydroponic Water that recirculates within the Hydroponic System. The pod collar has a funnel shape opening and a ridge on the upper hood of the pod collar, which facilitates and directs the flow of hydroponic water towards the plant matter by capillary action. The pod collar has a bulging bowl shape bottom to retain residual water for the plant to feed on should the circulation of hydroponic solution temporarily stops during watering intervals and to provide ample space for overgrown plant roots to grow. The pod assembly is made of food grade material, preferably Polyethylene Terephthalate with added Glycol (PetG), which eliminates the risk of contamination from alternatively using makeshift plastic pods intended for other non-food related purpose or from adhesives used to glue makeshift pods that may come in contact with the plant roots. Several pods can be installed vertically at staggered orientation in a Vertical Hydroponic pod system.

A Water Flow Diffuser above the installed pod assemblies in a Vertical Cylindrical Hydroponic System ensures that the re-circulated Hydroponic water distributes evenly onto the interior wall of a Vertical Hydroponic System. Eight (8) spring like arms of the Water Flow Diffuser presses against the interior wall of the pipe when installed. The bottom end of the diffuser attaches to the open end of the water pump hose on a Vertical Hydroponic System. The circulated Hydroponic water supplied by the water pump flows over the diffuser channeling the flow towards all directions around the interior wall of the uppermost pipe segment to feed the plants in the pod assemblies below a Cylindrical Vertical Hydroponic System. A diffuser cap is provided to cover the top opening of the diffuser whenever the supply of hydroponic water comes from an external overhead source rather than from the water pump hose below. This applies whenever a series or a chain of Vertical Hydroponic System share a common supply of recirculated Hydroponic Water and distributed by overhead piping or hose.

BRIEF DESCRIPTION OF THE DRAWINGS

FIG. 1 is an aerial angle close up view of an exemplary embodiment of the invention showing the two parts of the Pod Assembly unit attached together consisting of the Pod Collar and the Pod Ring.

FIG. 2 is a conceptual view of the exemplary embodiment showing the two parts of the Pod Assembly separately, comprising of the Pod Collar and the Pod Ring, and their respective features.

FIG. 4 is an aerial view of the exemplary embodiment of the invention showing the Pod Assembly attached to a pipe segment of a Vertical Hydroponic System FIG. 5 is an aerial angle view of the exemplary embodiment of the invention showing Water Flow Diffuser attached to the upper segment of a Vertical Hydroponic System FIG. 6 is a Conceptual and X-ray views of a Vertical Cylindrical Hydroponic System illustrates the exemplary embodiment of the invention showing the Hydroponic Pod Assembly attached to twelve (12) locations in the Hydroponic system and the Water Flow Diffuser attached to the uppermost segment of the same system. All other parts of the system are detailed and illustrated for further system discussion purposes only but are not part of the invention.

DETAILED DESCRIPTION

Figure 3A:
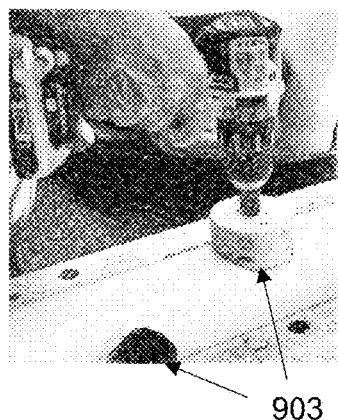
FIG. 3 is a sketch of the exemplary embodiment of the invention showing the method of attaching the Pod Assembly to a Vertical Hydroponic system

Referring to FIG. 1, a plastic molded hydroponic pod assembly made of flexible food grade Polyethylene Terephthalate with added Glycol (PetG) is shown with the two (2) parts assembled together, comprising a pod collar 1 and a locking pod ring 2. The pod collar 1 has grooved channeled edges that enables the collar to snap on to the perimeter edge of a circular hole 903 on a flat wall or a cylindrical wall surface of a Vertical Hydroponic system. The Pod assembly exemplified here attaches to a segment of the cylindrical chamber or pipe 902 of a Vertical Hydroponic system. A locking pod ring 2 in FIG. 1 shows the pod ring attached to the upper open end of the pod collar 1. The pod ring 2 rests securely in place by two notches on the base of the pod ring engaged against the two pins on the edge of the pod collar 1.

Referring to FIG. 2, the two components of the pod assembly, comprising a Pod Collar 1 and the Locking Pod Ring 2, shows the embodiment of the invention exploded with each of its respective features detailed.

The Pod Collar 1 has grooved channel 104 all around one end of the collar to grip onto the edges of the circular hole on the Hydroponic System wall. The Pod collar has a slit 106 on the topmost section to facilitate the flexing of the pod collar when engaging the grooved channel 104 of the pod collar to the circular hole on the cylindrical pipe on a Vertical Hydroponic System wall as described in FIG. 1. The pod ring on the pod assembly is set securely in place by engaging the two notches 201 on the base of the locking pod ring 2 to the two pins 105 on the edge of the open end of the pod collar 1 and slightly twisting the locking ring to set it in place. With the pod assembly in place, a plant matter encased in an absorbent filled and commercially available plant basket 901 (not part of this invention) inserts into the pod assembly. The bottom end of the commercially available plant basket 901 protrudes through the interior side of the hydroponic system enabling the plant matter to receive the necessary water nutrients circulating from within the interior chamber of the hydroponic system for plant growth. The pod assembly is adapted to hold the plant matter from its seedling stage up to its mature harvest stage. The pod collar 1 has a funnel shape opening 101 on top of the pod collar 1 to catch the water flowing on the interior surface of the Hydroponic system. The pod collar has a ridge 102 underneath the upper section of the pod collar that slants toward the basket to enable recirculated Hydroponic water to flow towards the basket by capillary action.

The pod collar has a bulging bowl shape bottom 103 to provide space for overgrown plant roots to grow and to allow retention of residual water for the plant to feed on whenever recirculating water temporarily stops during watering intervals.

The Pod Ring 2 has grooved channels 202 all around the bottom end that grip the top rim 107 of the open end of the pod collar. This grooved channel prevents the collar from imploding or dislodging out of the pod ring. The Pod Ring has two (2) notches 201 on either side of the Pod ring that engage with the two (2) pins 105 on the open end of the pod collar. The pod ring 2 has an opening to receive a standard size plant basket and a rim lip within the hole to hold the neck of the plant basket 901, which prevents it from going through the hole.

Referring to the notes on other features in FIG. 2, the plant basket is shown inserted into the pod assembly. A view from the bottom end of the pod collar shows the funnel shape opening 101 and the upper ridge 102 previously mentioned above that directs the water flow into the basket 901 where the plant is sheltered.

Figure 3B:
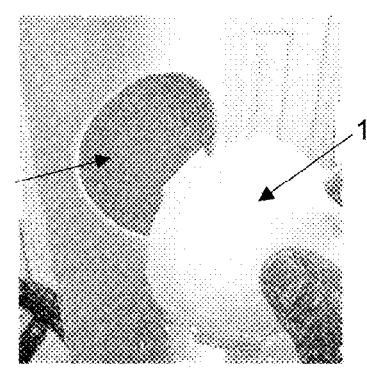
Figure 3C:
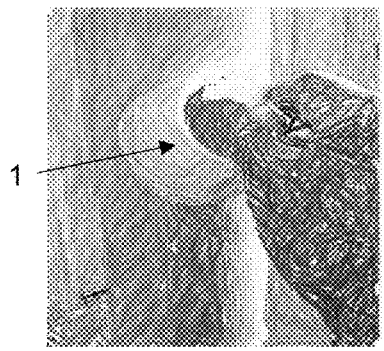
Figure 3D:
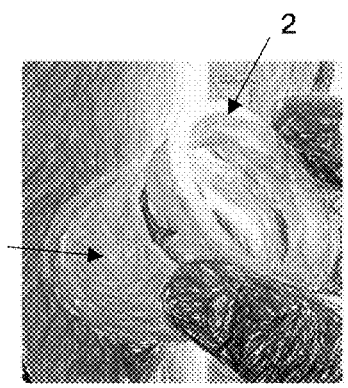
Figure 3E:
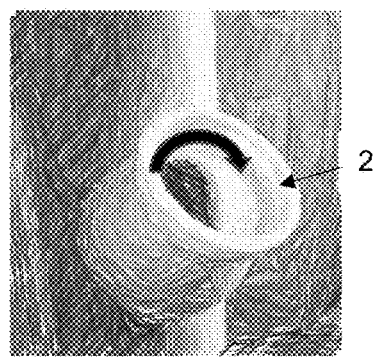

The sketches in FIG. 3 show the method of attaching the Hydroponic pod assembly to a 4" Diameter Vertical Hydroponic system exemplified here and detailed in a series of 5 steps below:

Step 1 (FIG. 3a)—Drill 3" Diameter hole on a 4" Diameter PVC Sewer Pipe of the 4" Diameter Vertical Hydroponic System (3" Diameter holes can be drilled into several locations 6 inches apart of a 4" diameter straight PVC pipe of a Vertical Hydroponic System Pod Assembly. Pod will work with Schedule 20 PVC Pipes).

Step 2 (FIG. 3b)—Insert the Pod Collar 1 into the hydroponic chamber hole 903 by attaching the top left quadrant of the groove channel of the pod collar to the top left quadrant of the drilled hole Step 3 (FIG. 3c)—Slightly flex the upper right quadrant of the pod collar 1 to allow the remaining grooved channel to seat on the remaining edge of the drilled hole until the slit ends of the pod collar meet and press against each other.

Step 4 (FIG. 3d)—Attach pod ring 2 onto the pod collar 1 by aligning the notches on the pod ring with the pins on the pod collar.

Step 5 (FIG. 3e)—Slightly twist the pod ring 2 to lock it in to the pod collar. This final step securely sets the pod assembly firmly onto the hydroponic system wall.

FIG. 4 is an aerial side view of the Water Flow Diffuser from the top angle and bottom angle views. Eight (8) arms project out of the Diffuser. The Diffuser attaches to the Vertical Hydroponic System chamber by pressing the diffuser into the inside wall of the uppermost segment of a Hydroponic System chamber and simultaneously engaging the arms to evenly press against the interior wall of the Vertical Hydroponic System. The bottom end of the diffuser 302 shows the tube where the outflow end of the water pump hose attaches. The water coming out above the diffuser flows out at eight different angles on the interior wall of the Hydroponic System by means of ridge and valley shape channels on the top side of the Diffuser. A cap 301 is supplied and optionally used to cover the top end whenever the water flow diffuser is used as a water flow diverter in instances when hydroponic water is not recycled from under the hydroponic chamber but instead fed from the top by a common overhead water line shared by a chain or series of vertical hydroponic systems.

FIG. 5 is an X-ray view of an exemplary embodiment of the invention showing the uppermost segment of a Vertical Hydroponic System with the Pod Assembly comprising a Pod Collar 1 and Pod Ring 2 attached to a 4" Diameter Hydroponic Pipe Chamber 902. A commercially available 2" Diameter basket 901 rests inside the Pod. The water flow diffuser is pressed against the interior wall of the upper segment of a Vertical Hydroponic System. A water pump hose 905 that pumps the hydroponic solution above the diffuser is shown attached to the bottom tube 302 of the diffuser.

Referring to FIG. 6, a Conceptual and X-ray view of a standard Vertical Hydroponic System shows the exemplary embodiment of the inventions assembled into a complete Vertical Hydroponic System. FIG. 6 shows twelve (12) pods, each pod comprising a Pod Collar 1 and a Pod Ring 2, attached to an 8-foot long PVC pipe 902 at alternating 45° angle, 6 inches apart. The PVC pipe 902 stands firmly on a 5-gallon drum 909 through the hole drilled on the cover of the drum 910 and a flange 907 glued to the bottom of the drum 909 to hold it upright. The drum contains Hydroponic water solution 908, which contains the necessary nutrients for plant growth. A water pump 906 submerged under the hydroponic water in the drum pumps water upwards through the ½" diameter hose 905, shown in the X-ray view on FIG. 6, as passing through the entire inner chamber of the hydroponic system. The open end of the pump hose 905 attaches to the bottom tube 302 of a Water Flow Diffuser 3. The Water Flow Diffuser 3 is attached to the uppermost segment of the Hydroponic System. The Diffuser directs the water coming out of the top side of the diffuser outwards towards the surface of the interior wall 902 of the Vertical Hydroponic System. The funnel shape opening on the top side of each pod previously described in detail in FIG. 2 catches the solution that flows through the interior wall of the Hydroponic Chamber 902. The solution flows towards the ridge on top of the pod by capillary action and the adhesion property of fluids directs the solution towards the basket pots to feed the plant matters sheltered in the pods. An absorbent material encases the plant matter inside the basket and helps keep the roots moist with hydroponic solution. The excess Hydroponic water 908 that flows down the interior wall of the hydroponic system chamber 902 settles to the drum 909 where the water pump 906 recirculates the hydroponic solution back to the top of the Vertical Hydroponic System and the recirculation continues.

What is claimed is:

1. A Hydroponic Pod Assembly System, comprising:
a vertical hydroponic system;
a hydroponic pod assembly comprising:
a pod collar; and
a pod ring having notches thereon;
a basket pot;
wherein;
said hydroponic pod assembly is configured to attach to the vertical hydroponic system to shelter and feed plant matter contained in the basket pot from seedling stage to mature harvest stage;
said pod collar comprises:
grooved channels on one end of the pod collar, the grooved channels attach to the edges of a drilled hole on a vertical hydroponic system;
a funnel shape opening on a top of the od collar configured to aid in channeling hydroponic water towards the interior of the pod collar;
an upper ridge underneath the top of the pod collar configured to further aid in channeling flow of hydroponic water towards the basket pot in the pod by capillary action and adhesion properties of liquids;
an incision on the top of the pod collar configured to enable the pod collar to flex in order to maneuver an entire perimeter of the groove channel end of the collar to the edges of a circular hole on the vertical hydroponic system;
wherein the pod collar is made of flexible injection molded plastic material including food grade Polyethylene Terephthalate with added Glycol (PetG);
wherein an open end of the pod collar is circular in shape to match a profile of said pod ring;
wherein the orientation of the pod collar is such that the basket pot containing plant matter is configured to rest at a 45° angle so that the base of the basket pot protrudes inside the hydroponic system wall to receive liquid nutrients from within the hydroponic system;
wherein a top end of the basket pot collar is configured to face up at 45° angle towards the sun or artificial lighting;
wherein the pod collar further comprises a bowl shape bottom configured to retain residual hydroponic water whenever circulation of water in the hydroponic system temporarily stops during timed watering intervals as well as providing room for overgrown plant roots; and
wherein said open end of the pod collar contains locking pins configured to match the notches on the pod ring.

2. The Hydroponic Pod Assembly as in claim 1, wherein said pod ring:
is made of the same material as the pod collar;
wherein the circular opening of the pod ring is the same size as the open end of the pod collar and configured to receive the basket pot;
wherein a grooved channel on the bottom rim of the pod ring matches with a profile on the open end of the pod collar to prevent collar from imploding or dislodging from the pod ring; and
wherein the pod collar further comprises two pins on the open end thereof;
wherein the pod ring has two notches configured to engage the two pins of the pod collar such that the pins will lock into the notches when the pod ring is slightly twisted.

3. A method of attaching a hydroponic pod assembly to a vertical hydroponic system comprising:
providing the hydroponic pod system of claim 1;
drilling a circular hole on a self-contained wall of the vertical Hydroponic system;
flexing a top and left quadrant of the pod collar and attaching the channeled end of the pod collar to the edges of top and left quadrant of the circular hole;
temporarily flexing the remaining section of the pod collar and maneuvering the remaining quadrants of the collar pod collar into remaining edges of the circular hole;
attaching a matching pod ring on the open end of the pod collar;
aligning the notches on two sides of the pod ring to the two pins on either side of the open end of the pod collar; and
twisting the pod ring to lock the pod ring to the pod collar.

* * * * *